United States Patent [19]

Floyd

[11] Patent Number: 4,893,776

[45] Date of Patent: Jan. 16, 1990

[54] PICTURE HANGING APPARATUS

[76] Inventor: John F. Floyd, 858 Glendayln Ave., Spartanburg, S.C. 29302

[21] Appl. No.: 246,790

[22] Filed: Sep. 20, 1988

[51] Int. Cl.[4] ........................ G01B 3/02

[52] U.S. Cl. ........................ 248/475.1; 33/666; 33/577; 248/544

[58] Field of Search ........................ 248/475.1, 544, 546, 248/489, 495; 33/666, 677, 577, 574

[56] References Cited

U.S. PATENT DOCUMENTS

| | | | |
|---|---|---|---|
| D. 282,054 | 1/1986 | Hoffman | 248/544 X |
| 1,143,821 | 6/1915 | Frazer | 33/574 |
| 3,516,165 | 6/1970 | Pfeffer | 33/574 |
| 4,220,309 | 9/1980 | Eisen et al. | 248/544 X |
| 4,363,173 | 12/1982 | Caldera | 33/666 |
| 4,382,337 | 5/1983 | Bendick | 33/574 |
| 4,473,957 | 10/1984 | Faulkner | 33/666 |
| 4,637,583 | 1/1987 | Babitz | 248/544 |

*Primary Examiner*—Ramon S. Britts
*Assistant Examiner*—Karen J. Chotkowski
*Attorney, Agent, or Firm*—Dority & Manning

[57] ABSTRACT

A device for marking the location of a hanger for an item to be hung. An elongated element is provided for receiving an item to be hung. The element has a plunger received thereon with a marker associated with the plunger. Depression of the plunger moves the marker from a non-marking position to a marking position which is opposite the point of support of the item whereby with the item located on the elongated element and held adjacent the wall where the item is to be hung, depression of the plunger will move the marker into contact with the wall to mark the point where a hanger should be installed to later support the item at the same location on the wall where it was held.

17 Claims, 2 Drawing Sheets

PICTURE HANGING APPARATUS

BACKGROUND OF THE INVENTION

This invention relates to an improved device for locating the point at which hanging means for supporting a picture frame or the like may be attached to a wall or other suitable surface.

In the past, the hanging of a picture on a wall has generally been a trial and error procedure. First, one must determine the desired position of the picture on the wall. Then means for hanging the picture such as a nail, hook or other common hanging device must be attached to the wall at such a point to correctly hang the picture in the desired location. It is often difficult to accurately predict the exact point at which the hanging means should be attached to the wall to achieve the desired position of the picture. This is especially true for a picture frame of the type having a wire attached at two points to the rear of the frame for supporting the frame as is commonly known. Often several attempts to the hanging means on the wall must be made. Each incorrectly placed introduction of a nail or the like into a wall undesirably and unnecessarily damages the structure creating unsightly holes which may remain in view after the picture is finally properly located unless appropriate patching, painting or the like is done.

Moreover, in order to attempt to properly locate a hanging object on a wall, numerous measurements are often made to locate a desired coordinate point to locate one hanger. Even then, after making the desired measurements, installing the hanger, and hanging the item thereon, it is often the case that once seeing the exact hanging location, it is decided that the item needs to be hung higher, lower, to one side or the like of the existing installed hanger. Again, therefore, further attempts are made, leading to the possibility of an exposed hole in the wall.

All of the above approaches are not only fraught with the problems noted, but frequently lead to disagreement and debate between spouses. The need for a device to better locate a hanger for an item to be hung is thus unquestionable.

Various devices have been proposed for aiding in locating the proper position to attach picture hanging devices to a wall. U.S. Pat. No. 3,516,165 to Pfeffer discloses a device including a flat bar with a hook and a tack disposed on opposite sides of one end of the bar. The picture is hung from the hook with the tack facing the wall, and the device is moved about until the desired location is reached. The user then presses the picture frame and device into the wall, causing the tack to make a hole in the wall. While such a device may operate satisfactorily, it has at least two drawbacks. First, pressing on the picture and/or frame to create the mark in the wall may damage the picture or frame. Second, the exposed tack at the rear of the device may inadvertently damage or scratch the wall surface during positioning of the device, thereby defeating the very purpose of the device.

U.S. Pat. No. 4,382,337 to Bendick discloses another device for locating the point on a wall at which hanging means may be attached. This device includes a circular member which includes a marking point which may consist of a ball point or lead. The circular member is hung from a piece of string with the marking point facing the wall. The circular member supports the picture frame to be hung, and force is applied to the picture to mark the wall once the desired location is reached. The device of Bendick may also inadvertently damage or mark the wall due to the fact that the pointer can contact the wall as the picture frame is moved about. The picture or frame may also be damaged during marking as noted above.

Various other devices (U.S. Pat. Nos. 4,413,421; 4,473,959; and 4,512,084) have been constructed to locate the proper point for attaching hanging means to a wall.

The present invention represents an improvement over the prior art noted above. Notably, a single device is provided which can be manipulated by one hand to locate the desired location for hanging and to mark the precise location on the wall. At the same time, due to the structure of the device of the present invention, no inadvertent marking of the wall will occur, nor any damage to the item being hung.

The present invention is neither taught nor suggested by the prior art noted above.

SUMMARY OF THE INVENTION

The present invention recognizes and addresses such drawbacks and other aspects of devices for properly locating the point at which picture hanging means may be attached to a wall.

Accordingly, it is an object of the present invention to provide an improved apparatus for marking a location on a wall where a hanger is to be installed from which an item may be hung.

It is another object of the present invention to provide an improved apparatus for assisting in hanging pictures and the like which will not inadvertently mark or damage a wall surface.

Another object of the present invention, is to provide a picture hanging apparatus with retractable marking means for marking a location on a wall where a hanger is to be installed.

Yet another object of the present invention is to provide a device for locating and marking a position on a wall for installation of a hanger which can be manipulated by one person.

These and other objects, aspects and features of this invention are more particularly discussed and described in the remainder of the specification. Various alterations and modifications to the features, elements and constructions disclosed herewith may occur to those of ordinary skill in the art, and are intended to come within the spirit and scope of this invention by virtue of present reference thereto. Such modifications and variations may include, but are not limited to, the substitution of functionally equivalent structures and elements for those expressly disclosed, illustrated, or suggested herewith, as well as the interchange of various features and elements presently disclosed.

BRIEF DESCRIPTION OF THE DRAWINGS

A full and enabling disclosure of the present invention, including the best mode thereof, to one of ordinary skill in the art is set forth more particularly in the remainder of this specification, including reference to the accompanying figures, in which.

DETAILED DESCRIPTION OF THE PREFERRED EMBODIMENT

Figure 1:
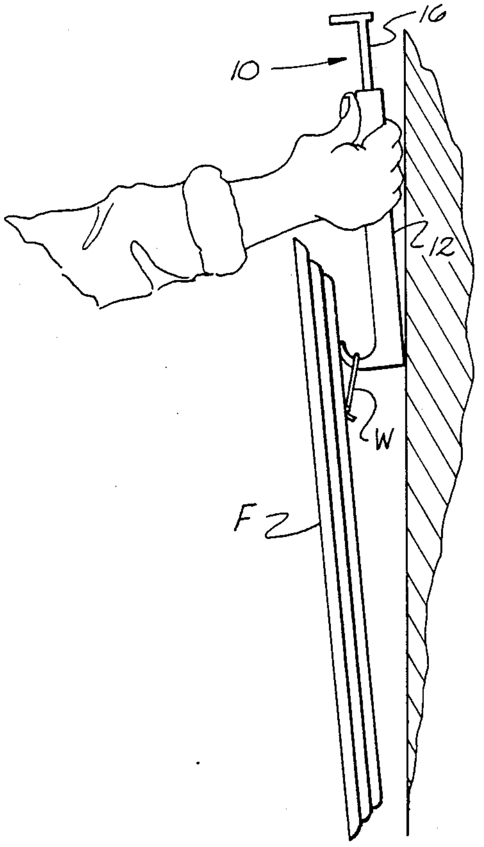
FIG. 1 illustrates a side elevational view of a device according to the present invention and illustrating a picture frame suspended from the device before marking of the wall.
Figure 2:
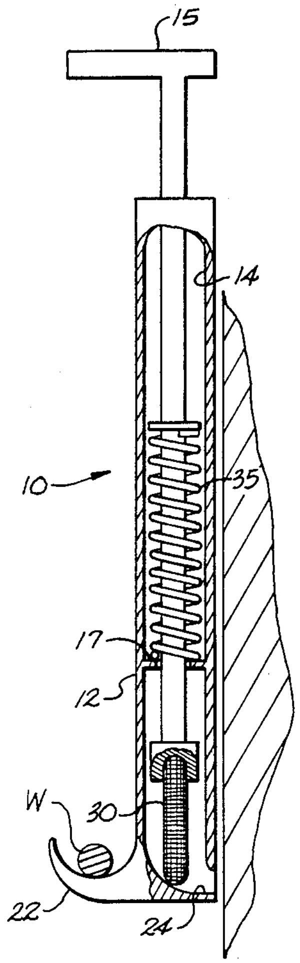
FIG. 2 is a partial cross-sectional view of a device according to the present invention as illustrated in FIG. 1 showing the marker retracted.
Figure 3:
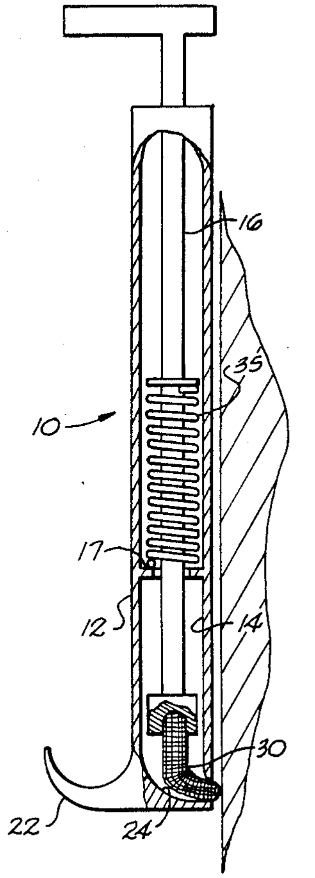
FIG. 3 is a partial cross sectional view of the device shown in FIG. 2 illustrating the marker extended into marking contact with a wall.

A preferred embodiment of a marking apparatus according to the present invention is illustrated in FIGS. 1, 2 and 3. Device generally 10 includes elongated element or housing 12 defining an opening 14 therethrough. A plunger 16 is received within the opening 14, and extends therealong. One end of plunger 16 extends above housing 12 and has a handle 15 secured thereto. Housing 12 has a projection 22 secured thereto and extending outwardly therefrom. Projection 22 is suitable for supporting a picture frame F or a wire W attached to a frame F (as shown in FIG. 1). While means for supporting an item to be hung are illustrated in the Figures as a projection 22, obviously such could take other form. By way of example, an angled slot (not shown) could be cut into housing 22. Also the actual shape of projection 22 is not intended to be limited to that as illustrated.

Disposed adjacent projection and on an opposite side of housing 12 is a guide means 24. As illustrated, housing 12 defines an opening 26 opposite projection 22 with guide means 24 located within opening 14 adjacent thereto. As will be described hereinafter, when the device 10 is properly located along a wall or other surface to be marked, a marking element can be moved along guide means 24 and through opening 26 into marking contact with the wall. With opening 26 and guide means 24 properly located with respect to projection 22, the marking means will make a mark on the wall or surface at a point which coincides with appropriate location of a hanger to support the item to be hung irrespective of the length of hanging wire or the like.

As illustrated, and as is preferred, plunger 16 extends along housing 12 and has a marking means 30 received at an end of same. Intermediate the length of plunger 16 is a coil spring 35 which engages a shoulder 17 located within opening 14. When plunger 16 is depressed as shown in FIG. 3, spring 35 compresses against shoulder 17. Upon release of plunger 16, spring 35 returns to its uncompressed form as shown in FIG. 2 and returns marking means 30 to its position within housing 12 where it is precluded from inadvertently marking the wall or surface.

In operation, one places a wire, etc. secured to a picture frame or other item to be hung about projection 22 and then moves housing 12 along the wall or other surface until a position is reached where it is desired for the item to be hung. With housing 12 and the item so located, plunger 16 is depressed which moves marking means 30 into contact with guide means 24. Continued depression of plunger 16 then causes marking means 30 to deflect, deform or otherwise move through opening 26 into contact with the wall. A mark is thus produced on the wall exactly where a hanger such as a nail or the like is to be installed to hand the item exactly as it appeared, supported from housing 12. All of the above is achieved without the need of multiple measurements. Consequently, mistakes that, as noted above, can deface a wall with abortive tries to properly locate a hanger are avoided. Also, when one atempting to locate the hanger is following instructions of another viewing the anticipated hanging location, precision may be achieved.

Figure 4:
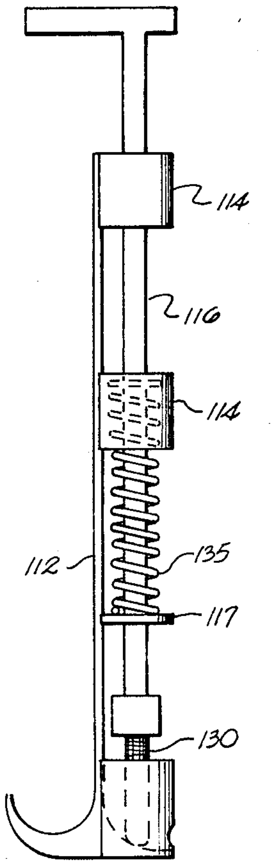
FIG. 4 is a side elevational view of a further embodiment of a marking device according to teachings of the present invention.

A further embodiment of the present invention is illustrated in FIG. 4, where an elongated element 112 has a plurality of brackets 114 which receive and support a plunger 116 with a spring 135 received therearound and in abutment with a shoulder 117, and a marking means 130 secured to a lower end of same. Operation of the device of FIG. 4 is the same as previously described. Element 112 is, however, skeletal in nature as opposed to a closed construction as shown for element 12 of FIGS. 1, 2 and 3. The structure of FIG. 4 would, of course, be lighter than that of FIGS. 1, 2 and 3, and would better permit changing of marking means 130 or removal of same for replenishment of ink supply.

Figure 5:
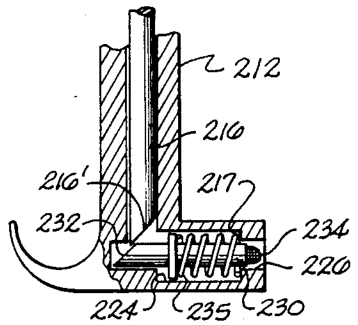
FIG. 5 is a partial cross-sectional view of a further embodiment of a device according to the present invention.

A further embodiment of apparatus according to the present invention is illustrated in FIG. 5 in which a housing or the like 212 is provided with a plunger 216 movable therealong. In FIG. 5, as opposed to the prior Figures, a marking means 230 is provided which is not secured to an end of plunger 216. Instead, marking means 230 resides on a guide means or surface 224 adjacent an opening 226 in housing 212. A spring 235 is received about marking means 230 and abuts a shoulder 217 thereat. Marking means 230 includes a rear beveled edge 232 and a marking tip 234. Likewise, a terminal end of plunger 216 has a beveled surface 216' which mates with beveled surface 232 of marking means 230. Consequently, with the device positioned adjacent a wall with the item to be hung suspended from projection 22, depression of plunger 216 brings beveled edges 216' and 232 together. Continued depression of plunger 216 will then cause marking means 230 to move to the right as illustrated, until marking tip 234 makes marking contact with the wall. Thereafter, upon release of plunger 216, spring 235 will expand and retract marking means 230 back into housing 212.

Marking means 30 may include a felt marker, charcoal, lead, a ballpoint or any other suitable element for marking a surface. Any type of flexible material may also be substituted for the spring 35, as long as it provides a normal bias to maintain marking means 30 out of marking contact.

Alternately, a sharp pin or tack (not shown) may be substituted for the marking means 30 to create a small hole to mark a desired location on the wall 46 without departing from the scope of the present invention. Furthermore, it is possible to orient the apparatus 10 so that the first end 18 of the housing 12 is disposed above the second end 20 of the housing 12 during positioning of a picture on a wall. The handle 36 would then be located below the projection 22 and therefore below the picture frame hung from the projection 22.

It will be understood by those of ordinary skill in the art that the foregoing specification and drawings discussed with reference thereto are only an exemplary embodiment of the present invention, with all such language being by way of example only. Moreover, individual features and aspects of the foregoing exemplary embodiment may be varied for accomodating such alternative applications, all without departing from the spirit of the present invention set forth in the appended claims.

What is claimed is:

1. A device for locating a point on a surface for installation of a hanger for an item to be hung on the wall comprising: an elongated support element, said element having means thereon for removably receiving an item to be hung, said element further having guide means located opposite said item hanging means; a plunger associated with said elongated element for movement with respect thereto, a marking means normally retained in a non-marking position and operably associated with said plunger and said guide means, a means for retaining said marking means in a non-marking position, said marking means being movable by said plunger from said non-marking position to a marking position, when desired.

2. A device for locating a point on a surface for installation of a hanger as defined in claim 1 wherein said elongated support element is tubular and said plunger and said marking means are partially located therewithin.

3. A device for locating a point on a surface for installation of a hanger as defined in claim 1 wherein said hanging means comprises a projection secured to said elongated element and extending outwardly therefrom and wherein said guide means comprises an arcuate surface.

4. A device for locating a point on a surface for installation of a hanger as defined in claim 1 wherein said plunger is secured to said marking means and said plunger and said marking means are biased in a non-marking position.

5. A device for locating a point on a surface for installation of a hanger as defined inclaim 4 wherein said elongated support element defines an opening therealong, said plunger and said marking means being movable along said opening.

6. A device for locating a point on a surface for installation of a hanger for an item to be hung on the wall comprising: an elongated support element, said element having means thereon for removably receiving an item to be hung, said element further having guide means located opposite said item hanging means; said guide means defining an arcuate surface located along said element; a plunger associated with said elongated element for movement with respect thereto, a marking means operably associated with said plunger and said guide means, said marking means being movable by said plunger between a non-marking and a marking position; said elongated support element defining an opening therealong, said plunger and said marking means being movable along said opening; and said marking means being flexible such that upon being moved by said plunger against said arcuate surface, said marking means deflects generally transversely with respect to said element and moves outwardly from said element to its marking position.

7. A device for locating a point on a surface for installation of a hanger as defined in claim 6 wherein spring means are received about said plunger to normally bias said marking means to a location within said opening and out of its marking position.

8. A device for locating a point on a surface for installation of a hanger as defined in claim 1 wherein said marking means is a felt marker.

9. A device for locating a point on a surface for installation of a hanger for an item to be hung comprising:

(a) an elongated support element, said element defining a guideway therealong, said element further having means thereon for removably receiving the item to be hung and guide means for a marking means on an opposite side thereof;

(b) a plunger located along at least a portion of said guideway and being movable thereat, an end of said plunger being exposed; and (c) marking means operatively associated with an end of said plunger and being located adjacent said guide means;

(d) means for retaining said marking means in a non-marking position;

whereby an item to be hung can be located on said hanging means, said element can be held adjacent said surface where said hanger is to be located and said plunger can be depressed to move said marking means from a non-marking position into marking contact with said surface to mark the point where a hanger for said item is to be installed.

10. A device for locating a point for installation of a hanger as defined in claim 9 wherein said element defines an opening therethrough and said plunger is located in said opening for movement therealong, said marking means being secured to an end of said plunger and being guided by said guide means to mark the point where the hanger is to be installed.

11. A device for locating a point for installation of a hanger for an item to be hung comprising:

(a) an elongated support element, said element defining a guideway therealong, said element further having means thereon for removably receiving the item to be hung and guide means for a marking means on an opposite side thereof;

(b) a plunger located along at least a portion of said guideway and being movable thereat, an end of said plunger being exposed, said element defining an opening therethrough and said plunger being located in said opening for movement therealong;

(c) marking means operatively associated with an end of said plunger and being located adjacent said guide means, said marking means being secured to an end of said plunger and being guided by said guide means to mark the point where the hanger is to be installed; and (d) means for biasing said marking means into said opening and out of position for marking said surface;

whereby an item to be hung can be located on said hanging means, said element can be held adjacent said surface where said hanger is to be located and said plunger can be depressed to move said marking means into marking contact with said surface to mark the point where a hanger for said item is to be installed.

12. A device for locating a point for installation of a hanger as defined in claim 11 wherein said biasing means is a spring received about said plunger.

13. A device for locating a point for installation of a hanger as defined in claim 12 wherein said marking means is an ink marker.

14. A device for locating a point for installation of a hanger as defined in claim 13 wherein said marking means is flexible.

15. A device for locating a point for installation of a hanger as defined in claim 9 wherein said hanging means on said elongated element comprises a projection secured to said element and extending outwardly therefrom.

16. A device for locating a point for installation of a hanger as defined in claim 9 wherein one end of said plunger extends above said element and has handle means secured thereto.

17. A device for locating a point for installation of a hanger for an item to be hung comprising:

(a) an elongated support element, said element defining a guideway therealong, said element further having means thereon for removably receiving the item to be hung and guide means for marking means on an opposite side thereof;

(b) a plunger located along at least a portion of said guideway and being movable thereat, an end of said plunger being exposed;

(c) marking means operatively associated with an end of said plunger and being located adjacent said guide means, said marking means being located at said guide means for movement therealong;

(d) spring means associated with said marking means to normally maintain said marking means out of marking position, said plunger and said marking means having mating surfaces thereon whereby movement of said plunger into contact with said marking means will move said marking means along said guide means into marking position; and (e) one end of said plunger extending above said element and having handle means secured thereto;

whereby an item to be hung can be located on said hanging means, said element can be held adjacent said surface where said hanger is to be located and said plunger can be depressed to move said marking means into marking contact with said surface to mark the point where a hanger for said item is to be installed.

* * * * *